XR 3,806,805

United States

Wall

[11] 3,806,805

[45] Apr. 23, 1974

[54] SYSTEMS FOR MONITORING MAINS ELECTRICAL POWER SUPPLIES

[75] Inventor: Reginald V. Wall, Sherborne, England

[73] Assignee: Plessey Handel und Investments AG, Zug, Switzerland

[22] Filed: Jan. 24, 1972

[21] Appl. No.: 220,010

[30] Foreign Application Priority Data

Jan. 25, 1971 Great Britain .................... 3106/71

[52] U.S. Cl. ............... 325/31, 235/52, 178/DIG. 13

[51] Int. Cl. ........................................ H04h 9/00

[58] Field of Search ....................... 235/52; 325/31; 178/DIG. 9, DIG. 13

[56] References Cited

UNITED STATES PATENTS

| | | | |
|---|---|---|---|
| 2,636,671 | 4/1953 | Shelby | 235/52 |
| 2,660,664 | 11/1953 | Richards | 325/31 |
| 2,716,702 | 8/1955 | Reynolds | 325/31 |
| 2,947,858 | 8/1960 | Abbott | 325/31 |

*Primary Examiner*—Benedict V. Safourek

*Attorney, Agent, or Firm*—Mason, Mason & Albright

[57] ABSTRACT

It has been found that a television receiver imposes on its mains power supply a pattern of load variations which is representative of the program being received. A television audience measuring system is proposed comprising means responsive to variations in the mains supply to a plurality of consumers whereby to produce a correspondingly varying signal, a band-pass filter for detecting the variations of this signal which lie within a predetermined pass band within which variations caused by a tuned television receiver are known to lie, correlating means for correlating the filtered signal with a reference signal which varies in a manner characteristic of load variations imposed by a television receiver receiving a particular program, and comparing means for comparing the correlated and filtered signals to produce an output signal indicative of the television audience for a program to which the reference receiver is tuned.

8 Claims, 8 Drawing Figures

SYSTEMS FOR MONITORING MAINS ELECTRICAL POWER SUPPLIES

The invention relates to systems responsive to the operation of mains-powered electrical appliances, and more specifically, but not exclusively, it relates to systems for television audience measurement.

According to the invention, there is provided a system responsive to the operation of mains-powered electrical appliances, including means operative to detect the pattern of load variations imposed on the mains supply by the appliances, and means for correlating the detected pattern with a reference pattern typical of particular ones of the appliances.

According to the invention, there is also provided a television audience measurement system, comprising means responsive to variations in a mains supply to a plurality of consumers whereby to produce a correspondingly varying electrical signal, filtering means for detecting the variations in the signal which lie within a predetermined pass band selected so as to pass variations at frequencies imposed on the mains supply by an operating television receiver, reference means operative to produce a reference signal which varies in a manner characteristic of load variations imposed on a mains supply by a television receiver receiving a particular programme, correlating means for correlating the filtered signal with the reference signal, and output means responsive to the correlated signal to produce an output signal representative of the television audience for the particular television programme.

According to the invention, there is further provided a method of estimating a television audience, in which the pattern of load variations imposed on a mains electrical power supply feeding a plurality of consumers is detected, filtered through a pass band in which a television receiver is known to produce load variations, and then correlated and compared with a reference pattern of load variations which corresponds to the pattern of load variations imposed by a television receiver tuned to a particular programme.

A television audience measuring system embodying the invention will now be described, by way of example only, with reference to the accompanying drawings in which.

The system to be described is for use in estimating the number of television receivers tuned to a particular programme at a given time. However, it is not limited to such an application but may be used in analogous applications as will be explained.

Figure 2A:
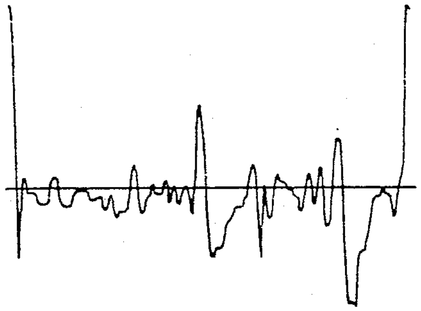
FIGS. 2A to 2C, 3A and 3B, 4A and 4B show examples of waveforms occurring in the system.
Figure 2B:
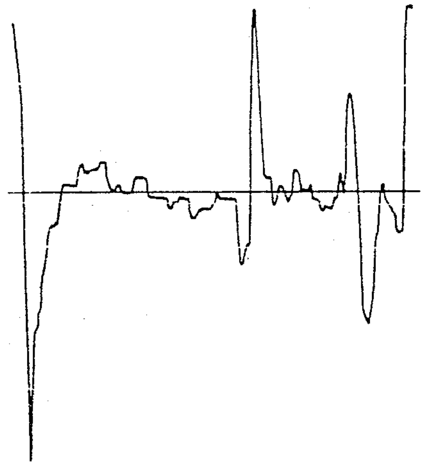
Figure 2C:
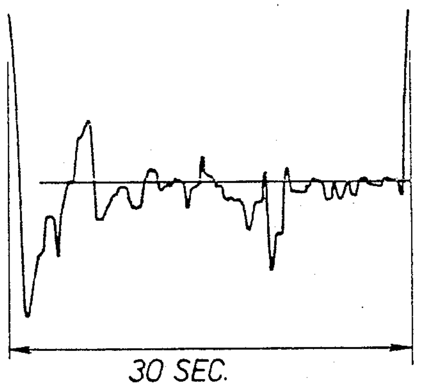
Figure 3A:
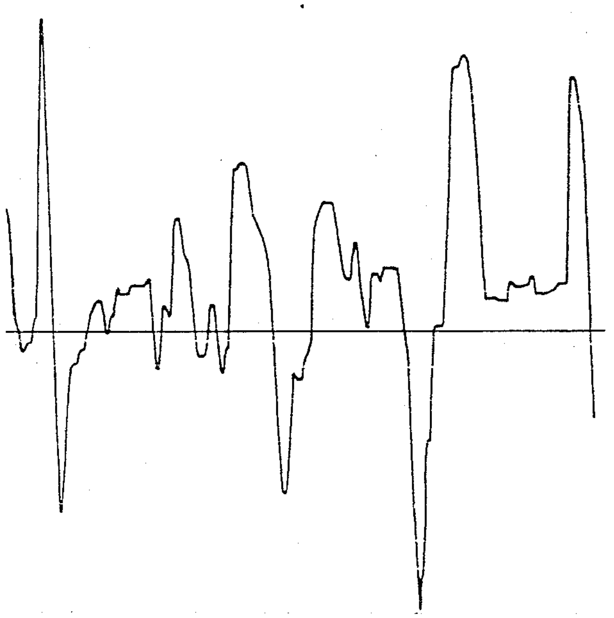
Figure 3B:
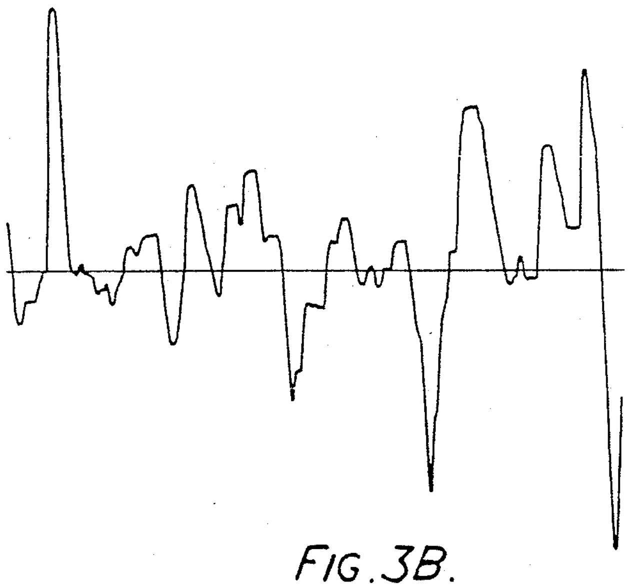
Figure 4A:
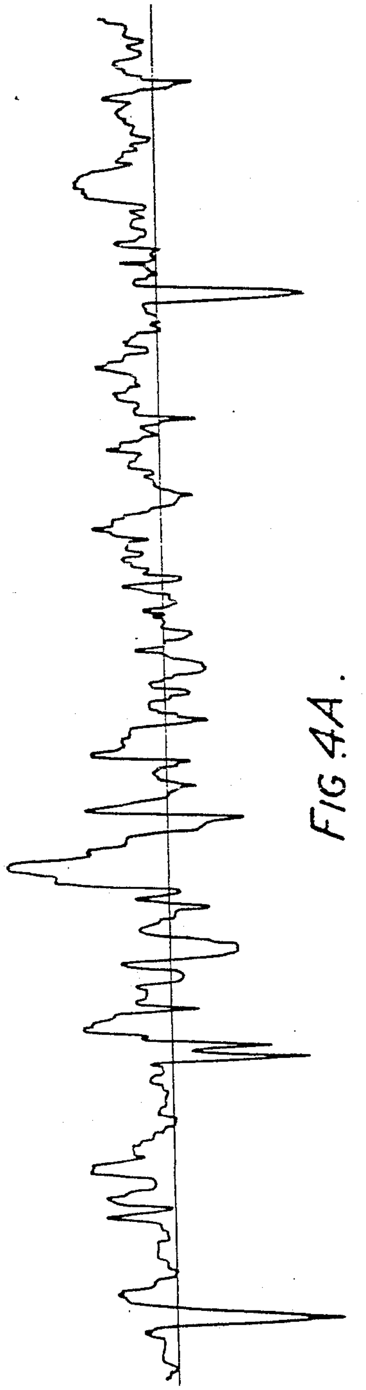
Figure 4B:
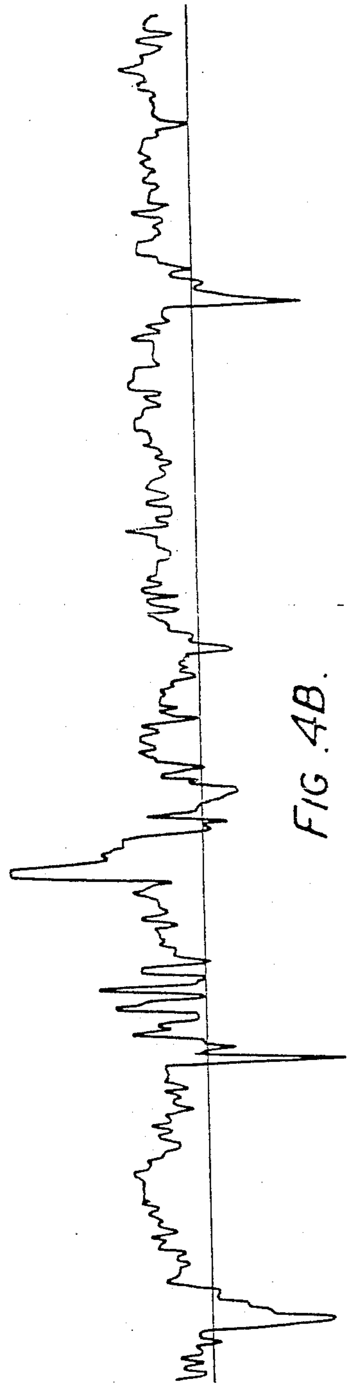

The system to be described responds to the effect which each television receiver has on the mains supply. It is found that the load imposed by the receiver on its mains power supply varies as the video and sound signals received by the receiver vary. Thus, for each programme or portion thereof received by the television receiver, there will be imposed by the receiver on the mains supply a characteristic pattern of load variation. FIGS. 2A to 2C respectively show the patterns of load variations imposed on the mains supply by three television commercials successively received by a television receiver. The variations shown occur within the band width of 0.2 to 2Hz, and the different load patterns obtained for the three commercials are clearly apparent. FIG. 3A shows the pattern of load variations measured for a particular commercial on one day, while FIG. 3B shows the pattern of load variations measured for the same commercial on another day (both load variations again occurring within a band width of 0.2 to 2Hz). A comparison of FIGS. 3A and 3B clearly shows very close identity. Finally, FIGS. 4A and 4B show further load variation patterns (within the same band width as before) obtained for the same programme transmitted on different days, and comparison of these two Figures again shows the high degree of identity.

In the system to be described, the load variations on the mains supply to consumers in a particular area are detected and correlated with those caused by a calibrated receiver tuned to a particular programme. This enables an estimation of the total number of receivers tuned to that programme in that area. The total pattern of load variation imposed on the mains supply will, of course, not be caused solely by television receivers but also by other consumer appliances. However, such other appliances will give different load patterns and the correlation process will remove or reduce the effect of these.

Figure 1:
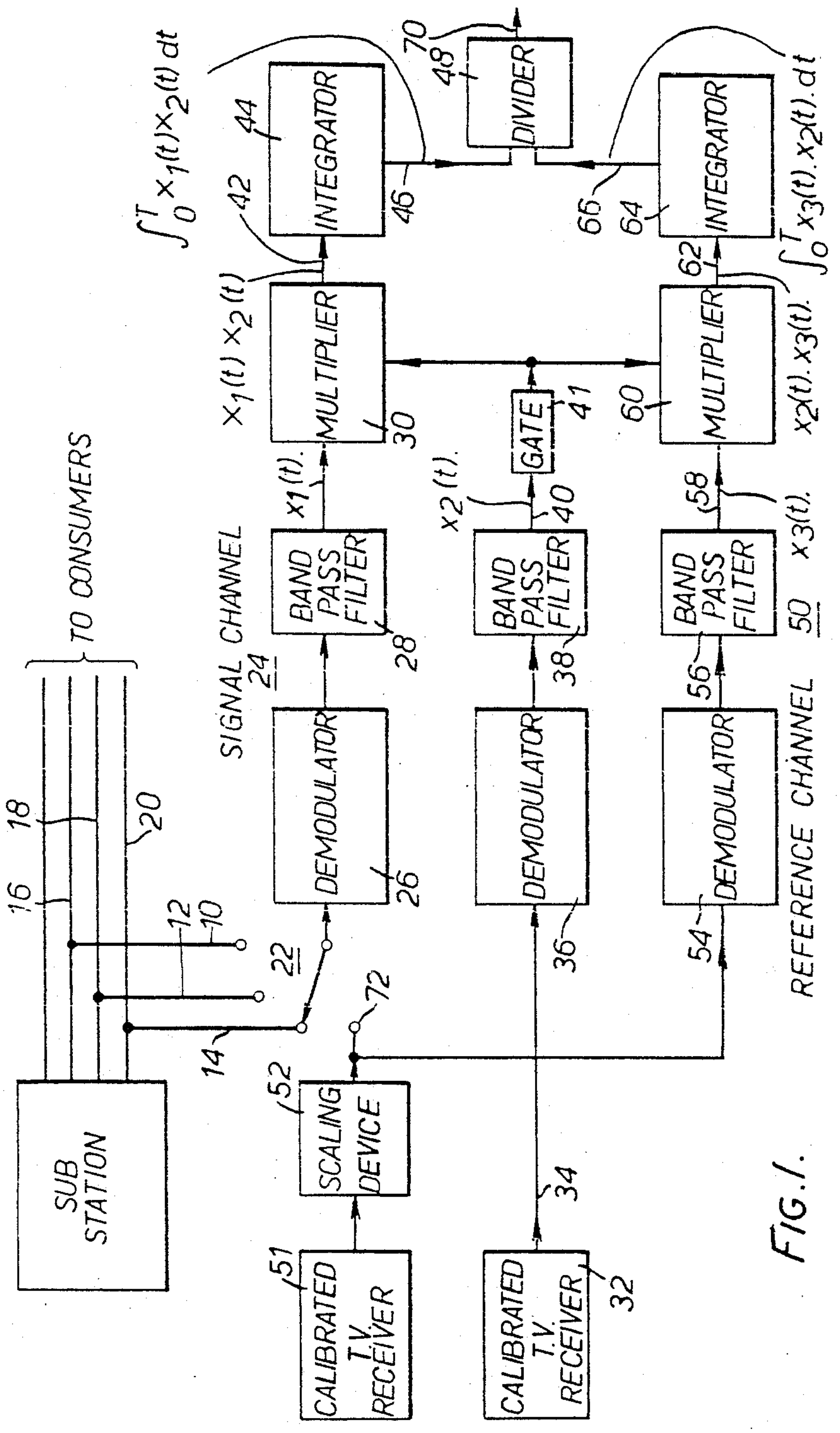
FIG. 1 is a block diagram of the system.

The system shown in FIG. 1 has three lines 10, 12, 14 which are respectively connected to means responsive to the current in the three phases 16, 18, 20 of the mains supply to the consumers within the area to be monitored, and each of the input lines 10 to 14 carries a signal representing the current in the respective phase. By means of a switch 22, each of the lines 10 to 14 can be connected in turn to a signal channel 24. Channel 24 comprises a 50 Hz demodulator 26 whose output is fed through a band pass filter 28 to one input of a multiplier 30. The system also includes a calibrated television receiver 32 whose mains supply is monitored by suitable means to produce a representative signal on a line 34. The signal on line 34 is fed to a 50 Hz demodulator 36 whose output is passed through a band pass filter 38 and applied to the second input of the multiplier 30 by means of a line 40 and via a gate 41.

The output signal on a line 42 from the multiplier 30 is fed to an integrator 44 whose output line 46 is fed to one input of a divider 48.

The system also includes a reference channel 50 which is fed from a second calibrated television receiver 51 via an adjustable scaling device 52. The output signal from the device 52 is fed through a 50 Hz demodulator 54 and passed to a band pass filter 56. The output line 58 of the filter 56 is applied to one input of a multiplier 60 whose second input receives the signal on the line 40. The output line 62 of the multiplier 60 is connected to an integrator 64 whose output line 66 feeds the second input of the divider 48.

In operation, the switch 22 is set to connect one of the input lines 10 to 14 to the signal channel 24. The current on this line, varying in a manner corresponding to that in the corresponding phase of the mains supply, is applied to the demodulator 26 which removes its 50 Hz component The resultant signal is then fed to the band pass filter 28 whose pass band is chosen to select the load variations caused by the consumers' television receivers. Thus, for example, the pass band may have the value of 0.2 to 2Hz or some other suitable figure such as 0.035 to 2Hz for example. The resultant signal, $x_1(t)$, from the band pass filter 28 is then applied to the first input of the multiplier 30.

At the same time, the calibrated television receivers 32 and 51 are both tuned to the particular programme to be monitored. Receiver 32 is producing a current signal on the line 34 corresponding to the load variations imposed by the calibrated receiver. This signal is demodulated in the demodulator 36 to remove the 50 Hz component and then applied to the filter 38 whose pass band is the same as that of the filter 28. The resultant output signal on the line 40, $x_2(t)$, is applied to the second input of the multiplier 30. The multiplier 30 thus produces an output signal $x_1(t)\cdot x_2(t)$ and this is applied to the integrator 44. The integrator 44 is arranged to integrate over a comparatively long period, say 40 seconds, and produces an output signal V1, where $$V1 = \int [x_1(t)\cdot x_2(t)] \cdot dt, \qquad (1)$$

and this is applied to the first input of the divider 48.

In addition, the output from the scaling device 52 is applied to the reference channel 50 where the demodulator 54 removes the 50 Hz component and applies the resultant signal to the band pass filter 56 whose pass band is the same as that of the filters 28 and 38. The output signal, $x_3(t)$, on line 58 is applied to one input of the multiplier 60 whose other input is receiving the signal $x_2(t)$. The multiplier 60 thus produces an output signal $[x_2(t)\cdot x_3(t)]$, and this is applied to the integrator 64 which integrates it over the same period as the period of the integrator 44. The output signal of the integrator 64 is therefore V2, where $$V2 = \int [x_3(t)\cdot x_2(t)] \cdot dt, \qquad (2)$$

and this is applied to the second input of the divider 48.

The divider 48 therefore produces an output signal V1/V2 on a line 70.

The multiplying process carried out by the multiplier 30 ensures that the input signal $[x_1(t)\cdot x_2(t)]$ to the integrator 44 is closely correlated with the particular pattern of load variations to be detected; that is, the multiplication process accentuates the load variations in the signal $x_1(t)$ which are due to the consumers' television receivers tuned to the same programme as receivers 32 and 51 and attentuates load variations due to other factors. As the multiplier 60 multiplies the signal $x_3(t)$ by the signal $x_2(t)$ as well, the multiplying factor $x_2(t)$ is not present in the output from the divider 48, and the output signal on the line 70 is therefore dependent on the number of consumers' television receivers supplied by the relevant supply phase and tuned to the same programme as the calibrated receivers 32 and 51.

The gate 41 is amplitude sensitive and restricts the correlation process to periods when large signals are present; this improves the correlation accuracy. The gate is used to inhibit the measurement when no signals are present, and may also be used to control the correlation period. In the latter case, either the time for which the gate is open (that is, the length of time for which signals are present) or the number of times the gate operates (that is, the number of times the signal changes) may be used.

The scaling device 52 enables the signals in the two channels 24 and 50 to be made approximately equal so as to enable most efficient operation of the units of the system, and the output on the line 70 must therefore be multiplied by the scale factor of the device 52 to produce the required indication of the number of receivers on the selected phase of the supply which are tuned to the same programme as the calibrated receivers 32 and 51.

By appropriately setting the obtainable 22, the number of sets tuned to the same programme as the receivers 32 and 51 and powered from each of the other two mains phases can be successively measured. If it is known that approximately the same number of consumers are fed by each of the three phases, then a sufficiently accurate reading may be obtained from one phase only.

In order to assess the number of receivers tuned to another programme, receivers 32, 51 are tuned to that programme, and the process described above is repeated.

In order to calibrate the system, the switch 22 is set so as to connect the demodulator 26 to a terminal 72 connected to the output of the attenuator 52. Thus, both channels 24 and 50 then receive the same input and can be adjusted until their two outputs are equal.

The receiver 51 may be dispensed with, and the input of the scaling device 52 connected directly to the output of the receiver 32. However, the use of two separate receivers avoids auto-correlation of noise in the reference channel.

It will be appreciated that the system shown in FIG. 1 is merely exemplary of many different ways of using the information present on the mains supply to assess the number of television receivers tuned to a particular programme.

It will be appreciated that the system described may produce an answer which is only accurate to, say, five or ten per cent, but such an answer will still be of important significance.

The signal received from the input probe 10, 12 or 14 need not be correlated immediately with the reference signal received from receivers 32 and 51, but the signals could be recorded and correlated later.

The received signal could be correlated with the sound or light emitted by the tuned reference receivers or with the broadcast signal from the transmitter instead of the pattern of load variations imposed by the reference receivers.

Systems embodying the invention may be used for purposes other than assessing the tuning of television receivers. For example, they could be used to assess the number of sound receivers tuned to a particular programme or, more generally, could be used to assess the number of consumers' appliances of any type imposing similar characteristic load variations on the mains supply.

"Calibration" in respect of the reference receivers 32 and 51 means setting them up periodically, when receiving a predetermined test transmission, to have a predetermined current consumption. This process, while beneficial to the results obtained from the system described, is not essential.

What is claimed is:

1. A system responsive to the operation of mains-powered television receivers, including detecting means comprising means responsive to variations in the mains electrical power supply to a plurality of consumers whereby to produce a correspondingly varying electrical signal, and filtering means for detecting the variations in the signal which lie within a predetermined pass band selected so as to pass variations at frequencies imposed on the mains supply by an operating television receiver, reference means comprising means operative to produce an electrical reference signal which varies in a manner characteristic of load variations imposed on its mains supply by a television receiver receiving a particular program, correlating means comprising first multiplying means for multiplying the reference signal and the filtered signal together to produce a product signal in which synchronous variations in the two multiplying signals are accentuated relative to asynchronous variations therein, and output means comprising second multiplying means connected to multiply the reference signal with another signal derived from the reference means and corresponding with the reference signal so as to produce a second output signal, and comparing means connected to receive the two product signals and to measure their ratio, whereby to produce an output signal representative of the television audience for the said particular television program.

2. A system according to claim 1, in which the said other signal is derived from the reference means via adjustable scaling means.

3. A system according to claim 1, in which the comparing means comprises integrating means connected to integrate the two product signals before their ratio is measured.

4. A method of estimating a television audience, comprising the steps of:

detecting the pattern of load variations imposed on a mains electrical power supply feeding a plurality of consumers, producing an electrical signal representing the said pattern, filtering the said electrical signal through a pass band in which television receivers are known to produce load variations, generating a reference signal representing the pattern of load variations imposed on its mains supply by a television receiver tuned to a particular program, correlating the filtered signal of load variations with the said reference signal by the step of multiplying the filtered signal and the reference signal together whereby to accentuate synchronous variations in the two multiplied signals relative to asynchronous variations therein, multiplying the reference signal and a signal corresponding to the reference signal, integrating the products obtained by the two multiplying steps, and measuring the ratio of the two integrated products, so as to produce an estimation of the number of television receivers powered by the said mains supply and tuned to the particular program.

5. A system for estimating the number of mains-powered television receivers tuned to receive electromagnetic radiation corresponding to a particular television program, comprising detecting means connected to the mains supply feeding a plurality of consumer appliances including the said television receivers, to produce an electrical signal representative of the pattern of load variations imposed on the mains supply by the consumer appliances, filtering means connected to receive the said electrical signal to filter it through a pass band in which television receivers are known to produce load variations in response to variations in the said electromagnetic radiation resulting from changes in transmitted program content, a mains-powered reference television receiver tuned to a particular program, reference means connected to the reference receiver to generate a reference electrical signal representing the pattern of load variations imposed on the mains supply by the reference television receiver due to variations in its received electromagnetic radiation resulting from changes in transmitted program content, correlating means connected to receive the filtered signal of load variations and the said reference signal and to correlate them whereby to accentuate synchronous variations in the two signals relative to asynchronous variations therein, and comparing means connected to receive the correlated signal and a signal corresponding to the said reference signal whereby to produce an output signal indicative of an estimation of the number of television receivers connected to the mains supply and tuned to the said particular program.

6. A system according to claim 5, in which the filtering means includes demodulating means for removing the fundamental mains frequency.

7. A system according to claim 5, in which the reference means comprises means responsive to the load variations imposed on its mains supply by the said reference receiver to produce a correspondingly varying electrical signal, and filtering means having a pass band corresponding to that of the first-mentioned pass band and responsive to the said correspondingly varying electrical signal to produce the reference signal.

8. A system according to claim 5, including a second mains-powered reference television receiver tuned to the said particular program and in which the reference means includes means connected to the second reference receiver to generate, as the said signal corresponding to the reference signal, a signal representing the pattern of load variations imposed on the mains supply by the second reference receiver due to variations in its received electromagnetic radiation resulting from changes in transmitted program content, the reference means including scaling means adjustable to alter the level of the said signal corresponding to the reference signal, so as to balance the two signals compared by the comparing means whereby to produce the said numerical estimation.

* * * * *